(No Model.)  2 Sheets—Sheet 1.
E. G. REILLY.
CAR BRAKE.
No. 349,608. Patented Sept. 21, 1886.
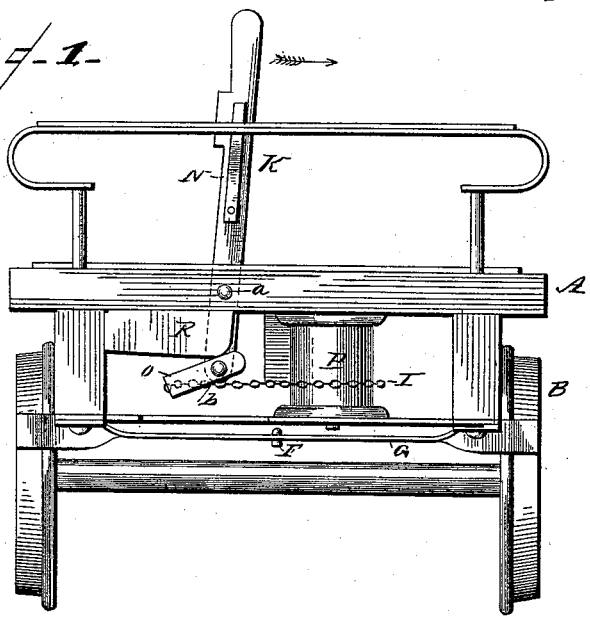
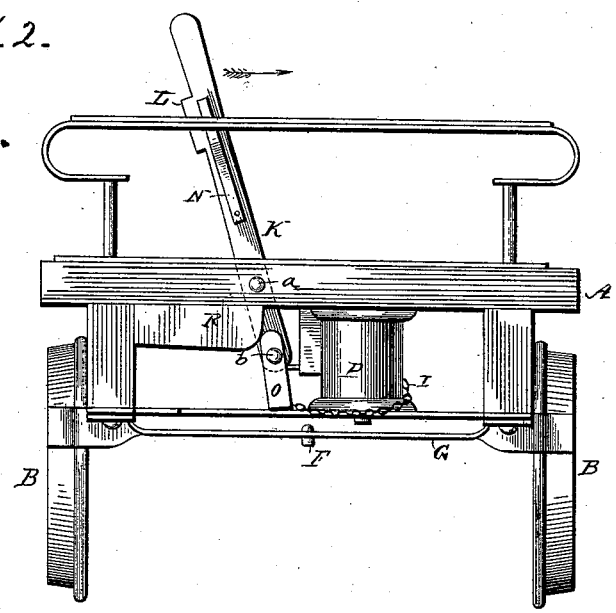
Witnesses
Edwin L. Jewell,
A. C. Rawlings
Inventor
Edwd. G. Reilly
By his Attorney

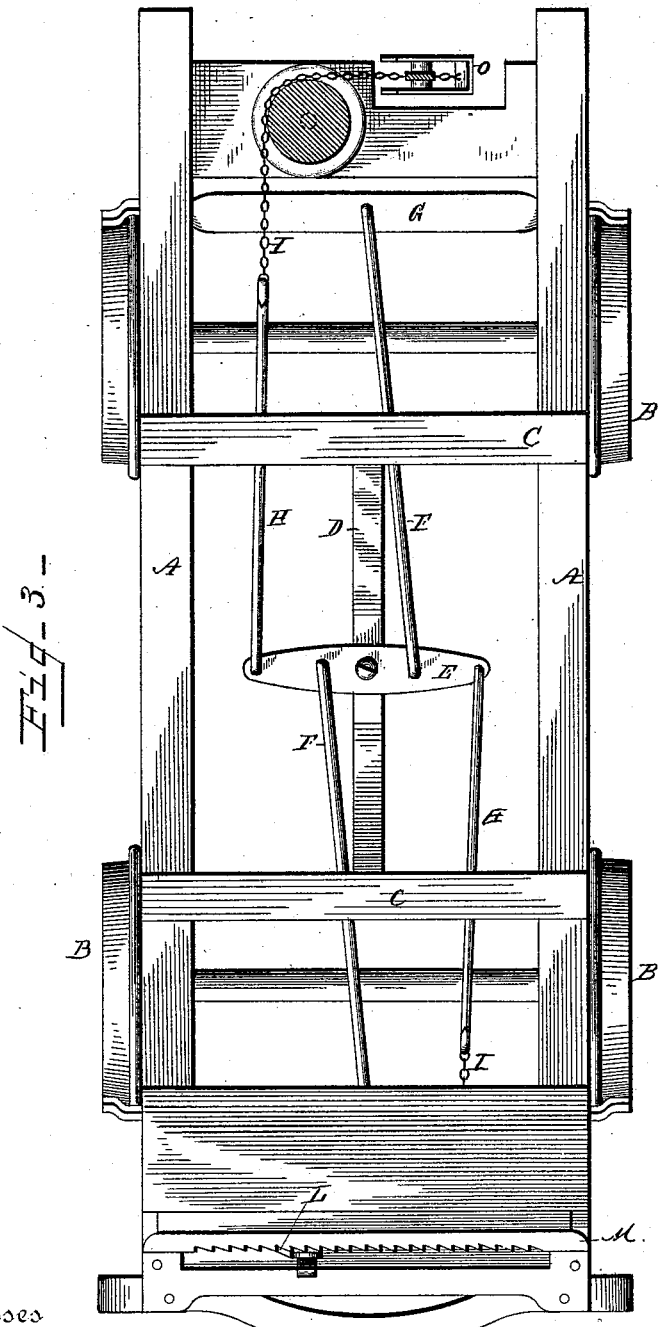

UNITED STATES PATENT OFFICE.

EDWARD G. REILLY, OF COLUMBUS, OHIO, ASSIGNOR OF ONE-HALF TO GEORGE W. BASSETT, OF SAME PLACE.

CAR-BRAKE.

SPECIFICATION forming part of Letters Patent No. 349,608, dated September 21, 1886.

Application filed March 2, 1886. Serial No. 193,767. (No model.)

*To all whom it may concern:*

Be it known that I, EDWARD G. REILLY, a citizen of the United States, residing at Columbus, in the county of Franklin and State of Ohio, have invented certain new and useful Improvements in Car-Brakes, of which the following is a specification, reference being had therein to the accompanying drawings.

My invention relates to improvements in car-brakes, the object of which is to enable the operator to quickly take up the slack in the brake-chain and rapidly apply the brakes to the wheels.

My invention consists of an operating-lever pivoted near its lower end to the car, and having pivoted to its lower end a supplemental lever or stirrup link, the upper end of which is brought in contact with a bracket by the movement of the main lever, so as to rapidly move the lower end of the supplemental lever to take up the slack of the brake-chain, one end of which is secured to the lower end of the supplemental lever, as will more fully appear.

Referring to the drawings, Figure 1 is an end view of the trucks and platform of a car, showing the brake-lever in the position in which the brakes are applied to the wheels. Fig. 2 is a similar view with the lever in position for moving the brakes from contact with the wheels. Fig. 3 is a top or plan view of the trucks and platform of a car with my improved brake attachment.

A indicates the frame of the platform of the car, and B the wheels or trucks of the same.

C are cross-bars secured to the frame A at proper distances apart, and to which the bar D is secured.

E is a bar or lever pivoted at its center to the center of the bar D, so as to be capable of being moved back and forth on its pivotal point.

F are bars or rods, one end of which are secured to the pivoted bar E on each side of the pivot-point, the other ends of said rods being secured to the brake-bars G.

H are rods secured to each end of the pivoted bar E, the front ends of said rods being provided with hooks or other suitable devices for securing the brake-chains I thereto.

These parts just described are of the ordinary or well-known construction, and need not be referred to further at this time.

K is the main operating-lever pivoted to the platform of the car at $a$, the upper portion of which is provided with a projection, L, adapted to engage with the teeth or notches of the bar M, which is secured to the dash-board of the car, said lever being also provided with a spring, N, which holds the projection L into engagement with the notches in the bar M.

O is a supplemental lever or stirrup pivoted to the lower end of the main operating-lever K, the upper ends of said supplemental lever or stirrup being projected a short distance above the pivoted point, and to which the other end of the brake-chain I is attached, said brake-chain being passed around the pulley-wheel P, and the other end attached to the bar or rod H.

R is a bracket, of any suitable form or construction, attached to the under side of the platform of the car, and in such relation to the supplemental lever or stirrup O that when the main lever is moved in the direction of the arrows the upper ends of the lever O will impinge against the bracket R, and, owing to the short bite or short leverage above the pivotal point $b$, the lower end of the lever or stirrup is moved rapidly to one side, which instantly takes up the slack of the chain L, and through the intermediate devices described the brakes are instantly applied to the tread of the wheels. It will be noticed that owing to the arrangement of the supplemental lever or stirrup a very slight motion of the lever K will instantly take up the slack of the brake-chain and bring the brake-blocks into contact with the wheels much more quickly than the devices now in use, and as the lower end of the supplemental lever is thrown over on a line at right angles to the lower end of the main lever the bite of the long lever is shortened and the power is increased in proportion to the throw or sweep of the supplemental lever and the time the most power is needed.

Having thus described my invention, what I claim, and desire to secure by Letters Patent, is—

1. In car-brakes, the main lever K, pivoted to the car, as described, and having a supplemental lever or stirrup pivoted to its lower end, adapted to be operated by coming in contact with a bracket, as set forth.

2. A brake-operating device for street-cars and other purposes, consisting of a main operating-lever having pivoted to its lower end a supplemental lever or stirrup to which the brake-chain is secured, a pulley or friction-roller over which the brake-chain passes, and a stop or bracket adapted to impinge on the short end of the supplemental lever, whereby the long arm of the supplemental lever is moved rapidly to take up the slack of the brake-chain and apply the brakes to the wheels, as set forth.

3. In car-brakes, the lever K, pivoted as described, and having the supplemental lever pivoted thereto, with short arms extending above the pivotal point, in combination with the bracket R, adapted to impinge on the short ends of the supplemental lever or stirrup to throw the same at right angles to the main lever, thereby shortening the bite of the main lever and increasing the power of the same, as set forth.

In testimony whereof I affix my signature in presence of two witnesses.

EDWARD G. REILLY.

Witnesses:
A. C. RAWLINGS,
WM. H. DeLACY.